United States Patent [19]
Kerr et al.

[11] Patent Number: 5,829,889
[45] Date of Patent: Nov. 3, 1998

[54] METHOD AND APPARATUS FOR MAGNETICALLY PRELOADING A BALL BEARING ASSEMBLY

[75] Inventors: Roger S. Kerr, Brockport; Svetlana Reznik, Rochester; Edward P. Furlani, Lancaster, all of N.Y.

[73] Assignee: Eastman Kodak Company, Rochester, N.Y.

[21] Appl. No.: 795,171

[22] Filed: Feb. 4, 1997

[51] Int. Cl.⁶ ........................................ F16C 19/06
[52] U.S. Cl. .............................................. 384/446
[58] Field of Search .................................... 384/446, 490, 384/517, 563; 360/106; 310/90.5

[56] References Cited

U.S. PATENT DOCUMENTS 5,355,268  10/1994  Schulze ................................ 360/106
5,598,048   1/1997  Dunfield et al. ..................... 310/90.5

*Primary Examiner*—Lenard A. Footland
*Attorney, Agent, or Firm*—Peyton C. Watkins

[57] ABSTRACT

An apparatus for maintaining a predetermined positional relationship of a screw, the apparatus comprises a ball bearing track having a first and second track member in a spaced apart relationship, and having a ball bearing therein for permitting rotation of the first track member with respect to the second member, and an element in a spaced apart relationship with respect to the ball bearing track for permitting the element to provide magnetic attraction between the first track member and the element.

10 Claims, 4 Drawing Sheets

METHOD AND APPARATUS FOR MAGNETICALLY PRELOADING A BALL BEARING ASSEMBLY

BACKGROUND OF THE INVENTION

CROSS-REFERENCE TO RELATED APPLICATIONS

This application is related to U.S. application Ser. No. 08/621,417 entitled "AN APPARATUS FOR PREVENTING AXIAL MOVEMENT OF A LEAD SCREW" by Roger S. Kerr et. el.

FIELD OF THE INVENTION

This invention relates generally to the field of lathe bed scanners utilizing a rotating lead screw having a ball bearing track assembly and, more particularly, to such ball bearing track assemblies having a magnetically preloaded, ball bearing track assembly.

BACKGROUND OF THE INVENTION

Color-proofing is the procedure used by the printing industry for creating representative images that replicate the appearance of printed images without the cost and time required to actually set up a high-speed, high-volume printing press to print an example of the images intended. One such color proofer is a lathe bed scanner which utilizes a thermal printer having half-tone capabilities. This printer is arranged to form an image on a thermal print medium, or writing element, in which a donor transfers a dye to the thermal print medium upon a sufficient amount of thermal energy. This printer includes a plurality of diode lasers which can be individually modulated to supply energy to selected areas of the medium in accordance with an information signal. The print-head of the printer includes one end of a fiber optic array having a plurality of optical fibers coupled to the diode lasers. The thermal print medium is supported on a rotatable imaging drum, and the printhead with the fiber optic array is movable relative to the longitudinal axis of the drum. The dye is transferred to the thermal print medium as the radiation, transferred from the diode lasers to the donor element by the optical fibers, is converted to thermal energy in the donor element.

For permitting relative movement of the print-head, the print-head is placed on a rotatable lead screw having a threaded shaft. The lead screw rests between two sides of the frame of the scanner where it is supported on both ends by bearings. At the drive end, the lead screw continues through the bearing, through a pair of spring retainers that are separated and loaded by a compression spring and to a drive motor. The drive motor induces rotation to the screw, and the compression spring functions to limit axial movement of the lead screw.

The print-head is attached to the threaded shaft of the lead screw by a drive nut which is configured to move the print-head along the threaded shaft as the lead screw is rotated by the drive motor. The lateral movement of the print-head is controlled by switching the direction of the rotation of the lead screw.

Although the presently known and utilized scanner is satisfactory, it is not without shortcomings. The spring that limits the axial movement of the lead screw should obviously be calibrated, and should also by replaced periodically due to mechanical aging. This is obviously labor intensive, time consuming and expensive.

Consequently, a need exists for improvements in the construction of the lathe bed scanner so as to overcome the above-described shortcomings.

SUMMARY OF THE INVENTION

The present invention is directed to overcoming one or more of the problems set forth above. Briefly summarized, according to one aspect of the present invention, the invention resides in an apparatus for maintaining a predetermined positional relationship of a screw, the apparatus comprising (a) a ball bearing track having a first and second track member in a spaced apart relationship, and further having a ball bearing therein for permitting rotation of the first track member with respect to the second member, and (b) an element in a spaced apart relationship with respect to said ball bearing track for permitting said element to provide magnetic attraction between said first track member and said element.

It is the object of the present invention to magnetically preload the ball bearing track assembly to over come the above-described drawbacks.

It is an object of the present invention to eliminate the need for the preload spring and its related devices.

It is an advantage of the present invention to provide improved reliability of the ball bearing track assembly.

It is an advantage of the present invention to eliminate preload error due to improper set up of preload equipment.

It is an advantage of the present invention to provide a preload method and apparatus for a ball bearing track assembly that reduces or eliminates the need for calibration.

It is an advantage of the present invention to provide a convenient and inexpensive method for preloading of ball bearing track assemblies.

The above and other objects of the present invention will become apparent when taken in conjunction with the following description and drawings wherein identical reference numerals have been used, where possible, to designate identical elements that are common to the figures.

DETAILED DESCRIPTION OF THE INVENTION

Figure 1:
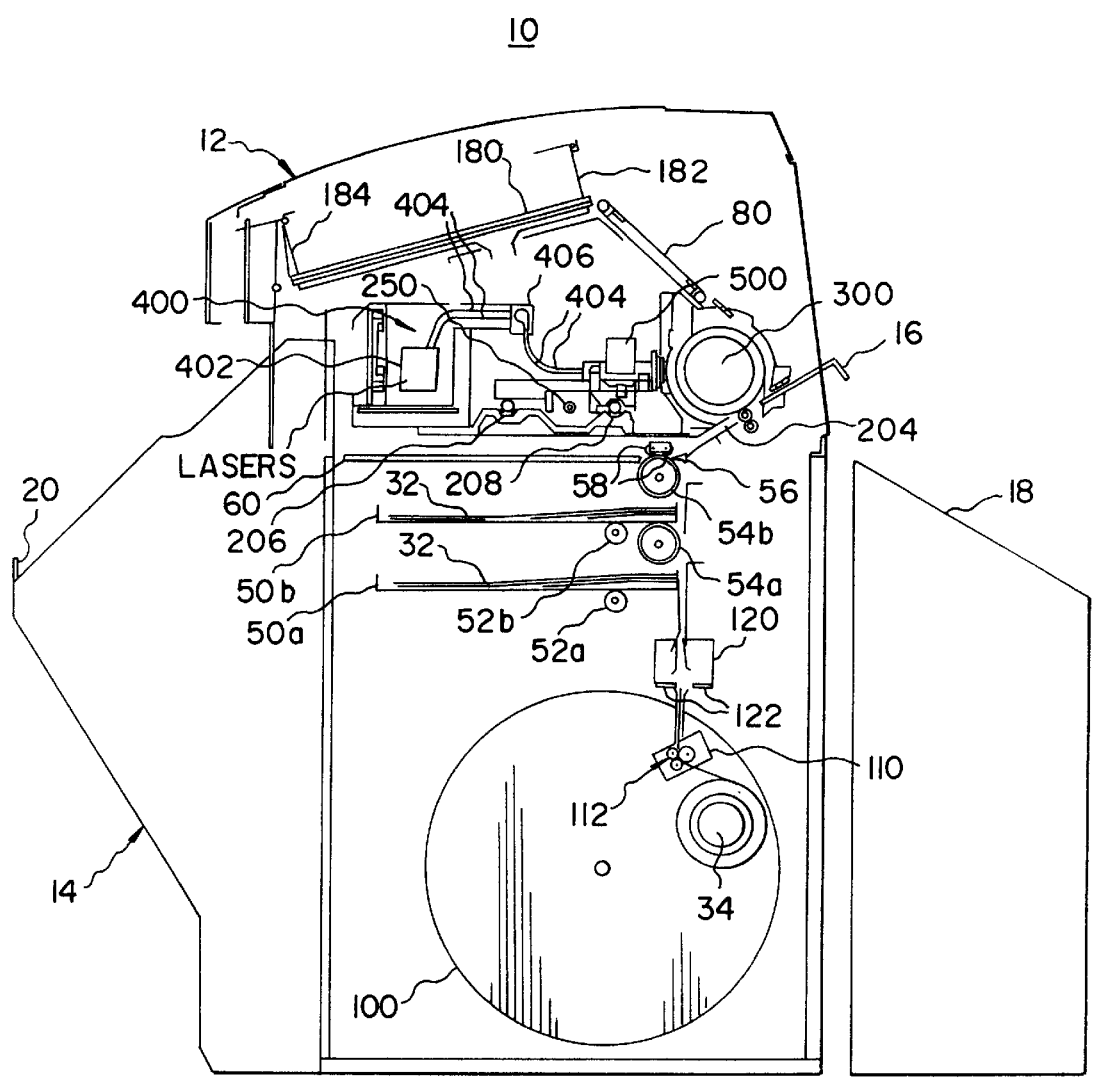
FIG. 1 is a side view in vertical cross section of an image processing apparatus of the present invention.

Referring to FIG. 1, there is illustrated an image processing apparatus 10 according to the present invention having an image processor housing 12 for forming a protective cover. A movable, hinged image processor door 14 is attached to the front portion of the image processor housing 12 for permitting access to two sheet material trays, lower sheet material tray 50a and upper sheet material tray 50b, that are positioned in the interior portion of the image processor housing 12 for supporting thermal print media 32 thereon. It will be obvious to those skilled in the art that only one of the sheet material trays 50 will dispense the thermal print media 32 out of its sheet material tray 50 to create an intended image thereon; the alternate sheet material tray 50 either holds an alternative type of thermal print media 32 or functions as a back up. In this regard, the lower sheet material tray 50a includes a lower media lift cam 52a for lifting the lower sheet material tray 50a and ultimately the thermal print media 32 upwardly toward a rotatable, lower media roller 54a and, ultimately, toward a second rotatable, upper media roller 54b which, when both are rotated, permit the thermal print media 32 to be pulled upwardly towards a media guide 56. The upper sheet material tray 50b includes a upper media lift cam 52b for lifting the upper sheet material tray 50b and ultimately the thermal print media 32 towards the upper media roller 54b which directs it towards the media guide 56.

The movable media guide 56 directs the thermal print media 32 under a pair of media guide rollers 58 which engages the thermal print media 32 for assisting the upper media roller 54b in directing it onto the media staging tray 60. The media guide 56 is attached and hinged to the interior of the housing 12 at one end, and is uninhibited at its other end for permitting multiple positioning of the media guide 56. The media guide 56 then rotates its uninhibited end downwardly, as illustrated in the position shown, and the direction of rotation of the upper media roller 54b is reversed for forcing the thermal print medium receiver sheet material 32 resting on the media staging tray 60 under the pair of media guide rollers 58, upwardly through an entrance passageway 204 and around a rotatable vacuum imaging drum 300.

A roll of dye donor material 34 is connected to the media carousel 100 in a lower portion of the image processor housing 12. Four rolls are used, but only one is shown for clarity. Each roll includes a dye donor material 34 of a different color, typically black, yellow, magenta and cyan. These dye donor materials 34 are ultimately cut into dye donor sheet materials and passed to the vacuum imaging drum 300 for forming the medium from which dyes imbedded therein are passed to the thermal print media 32 resting thereon, which process is described in detail herein below. In this regard, a media drive mechanism 110 is attached to each roll of dye donor material 34, and includes three media drive rollers 112 through which the dye donor material 34 of interest is metered upwardly into a media knife assembly 120. After the dye donor material 34 reaches a predetermined position, the media drive rollers 112 cease driving the dye donor material 34 and the two media knife blades 122 positioned at the bottom portion of the media knife assembly 120 cut the dye donor material 34 into dye donor sheet materials. The media rollers 54 and media guide 56 then pass the dye donor sheet material onto the media staging tray 60 and ultimately to the vacuum imaging drum 300 and in registration with the thermal print media 32 using the same process as described above for passing the thermal print media 32 onto the vacuum imaging drum 300. The dye donor sheet material now rests atop the thermal print media 32 with a narrow gap between the two created by microbeads imbedded into the thermal print media 32.

A laser assembly 400 includes a quantity of laser diodes 402 in its interior portion, and these lasers 402 are connected via fiber optic cables 404 to a distribution block 406 and ultimately to the printhead 500. The printhead 500 directs thermal energy received from the laser diodes 402 for causing the dye donor sheet material to pass the desired color of dye across the gap to the thermal print media 32. The printhead 500 is attached to a lead screw 250 via a lead screw drive nut 254 (not shown in FIG. 1) for permitting movement axially along the longitudinal axis of the vacuum imaging drum 300 for transferring the data to create the intended image onto the thermal print media 32.

For writing, the vacuum imaging drum 300 rotates at a constant velocity, and the printhead 500 begins at one end of the thermal print media 32 and traverses the entire length of the thermal print media 32 for completing the transfer process for the particular dye donor sheet material 36 resting on the thermal print media 32. After the printhead 500 has completed the transfer process, the particular dye donor sheet material resting on the thermal print media 32 is then removed from the vacuum imaging drum 300 and transferred out the image processor housing 12 via a skive or ejection chute 16. The dye donor sheet material eventually comes to rest in a waste bin 18 for removal by the user. The above described process is then repeated for the other three rolls 30 of dye donor materials 34.

After the color from all four sheets of the dye donor sheet materials 36 have been transferred, the thermal print media 32 is transported via a transport mechanism 80 through an entrance door 182 to a color binding assembly 180. The entrance door 182 is opened for permitting the thermal print media 32 to enter the color binding assembly 180, and shuts once the thermal print media 32 comes to rest in the color binding assembly 180. The color binding assembly 180 processes the thermal print media 32 for further binding the transferred colors on the thermal print media 32 and for sealing the microbeads thereon. After the color binding process has been completed, a media exit door 184 is opened and the thermal print media 32 with the intended image thereon passes out of the color binding assembly 180 and the image processor housing 12 and comes to rest against a media stop 20.

Figure 2:
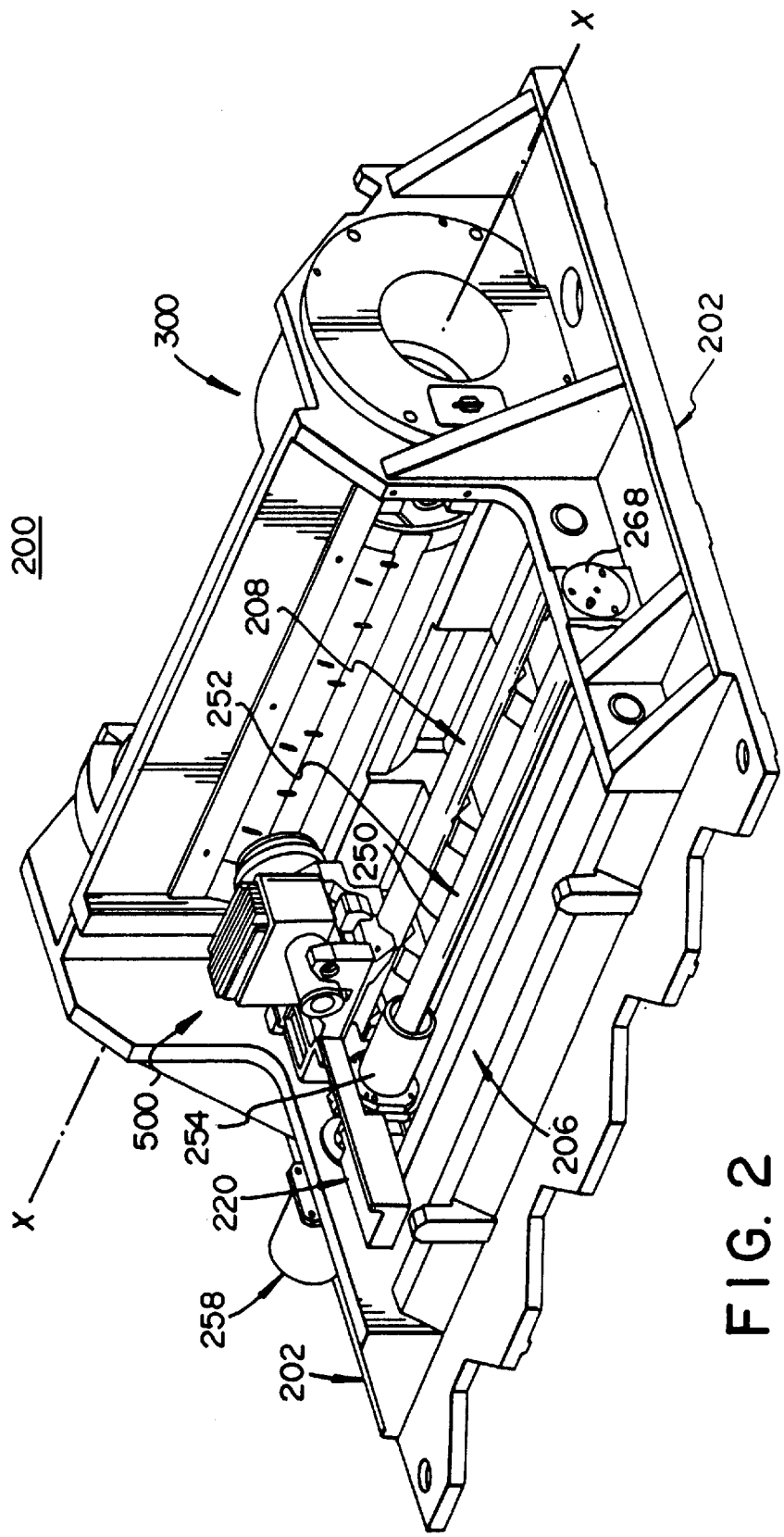
FIG. 2 is a perspective view of the lathe bed scanning subsystem or write engine of the present invention.

Referring to FIG. 2, there is illustrated a perspective view of the lathe bed scanning subsystem 200 of the image processing apparatus 10, including the vacuum imaging drum 300, printhead 500 and lead screw 250 assembled in the lathe bed scanning frame 202. The vacuum imaging drum 300 is mounted for rotation about an axis X in the lathe bed scanning frame 202. The printhead 500 is movable with respect to the vacuum imaging drum 300, and is arranged to direct a beam of light to the dye donor sheet material (shown in FIG. 1). The beam of light from the printhead 500 for each laser diode 402 (not shown in FIG. 2) is modulated individually by modulated electronic signals from the image processing apparatus 10, which signals are representative of the shape and color of the original image, so that the color on the dye donor sheet material 36 is heated to cause volatilization only in those areas in which its presence is required on the thermal print media 32 to reconstruct the shape and color of the original image.

The printhead 500 is mounted on a movable translation stage member 220 which, in turn, is supported for low friction slidable movement on translation bearing rods 206 and 208. The translation bearing rods 206 and 208 are sufficiently rigid so that they do not sag or distort between their mounting points and are arranged as parallel as possible with the axis X of the vacuum imaging drum 300 with the axis of the printhead 500 perpendicular to the axis X of the vacuum imaging drum 300 axis. The front translation bearing rod 208 locates the translation stage member 220 in the vertical and the horizontal directions with respect to axis X of the vacuum imaging drum 300. The rear translation bearing rod 206 locates the translation stage member 220 only with respect to rotation of the translation stage member 220 about the front translation bearing rod 208 so that there is no over-constraint condition of the translation stage member 220 which might cause it to bind, chatter, or otherwise impart undesirable vibration or jitters to the printhead 500 during the generation of an intended image.

Figure 3:
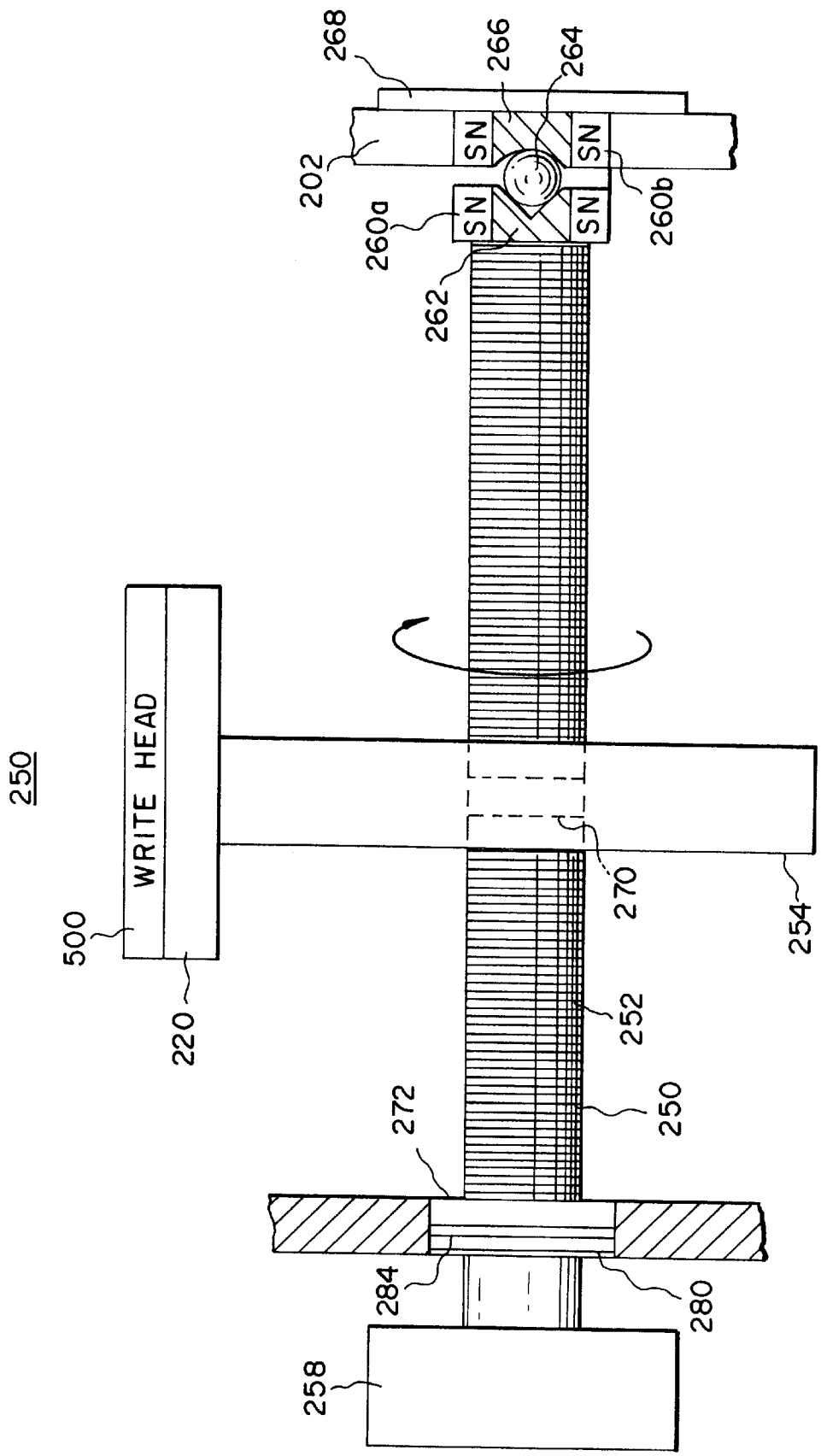
FIG. 3 is a side view in horizontal cross section of the lead screw of the present invention.

Referring to FIGS. 2 and 3, a lead screw 250 includes an elongated, threaded shaft 252 which is attached to a linear drive motor 258 on its drive end and to the lathe bed scanning frame 202 by a magnetically preloaded radial ball bearing 272. The drive nut 254 includes grooves in its hollowed-out center portion 70 for mating with the threads of the threaded shaft 252 for permitting the lead screw drive nut 254 to move axially along the threaded shaft 252 as the threaded shaft 252 is rotated by the linear drive motor 258. The drive nut 254 is integrally attached to the to the printhead 500 through the lead screw coupling (not shown) and the translation stage member 220 at its periphery so that as the threaded shaft 252 is rotated by the linear drive motor 258 the lead screw drive nut 254 moves axially along the threaded shaft 252 which in turn moves the translation stage member 220 and ultimately the printhead 500 axially along the vacuum imaging drum 300.

The lead screw 250 operates as follows. The linear drive motor 258 is energized and imparts rotation to the lead screw 250, as indicated by the arrows, causing the lead screw drive nut 254 to move axially along the threaded shaft 252. The annular-shaped axial load magnets 260a and 260b prevent axial movement of the lead screw 250. A ball 264 interfaces with an insert 266 that is attached to an end cap 268 which is mounted to the lathe bed scanning frame 202 for providing an axial stop for the lead screw 250. The ball 264 permits rotation while maintaining the positional relationship of the lead screw 250.

Figure 4:
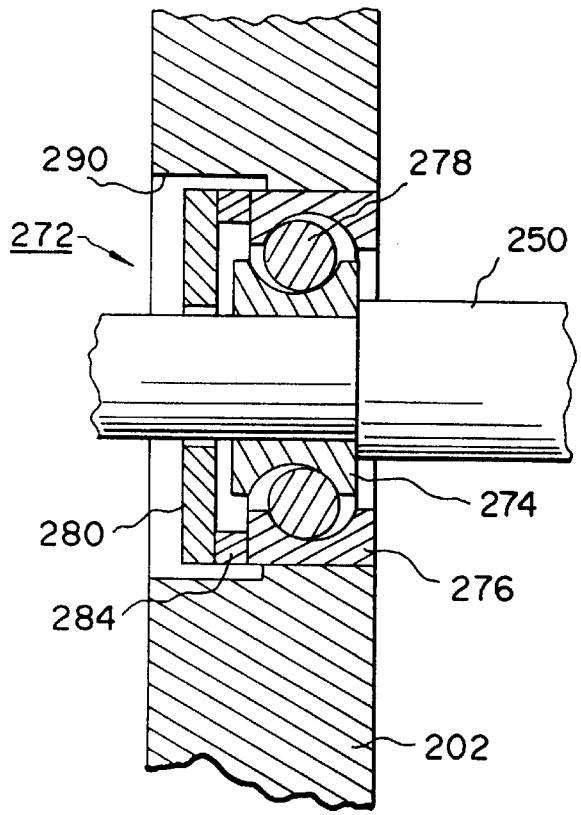
FIG. 4 is a side view that is partially in horizontal cross section of the ball bearing assembly of the present invention.

Referring to FIG. 4, there is illustrated a partial side view in horizontal cross section of the ball bearing assembly of the present invention. The radial ball bearing assembly 272 includes an annular-shaped, ferromagnetic inner bearing race 274 and an annular-shaped, ferromagnetic outer bearing race 276 matingly disposed in the frame 202 in a spaced apart relationship. The frame 202 includes a two-tiered bore 290 therethrough for receiving the ball bearing assembly 272 therein. The inner bearing race 274 rests against a lip portion of the lead screw 250 for assisting in maintaining it in the bore 290. A ball bearing 278 is disposed in notched-out portions of the bearing races 274 and 276 for permitting one race to rotate while the other race is stationary, for example race 274 rotates and face 276 is stationary in the preferred embodiment of FIG. 4. The radial ball bearing assembly 272 supports the lead screw 250 at the drive end, and is magnetically preloaded by an annular-shaped, preload member 280, which is preferably a permanent magnet made of rare-earth materials such as neodymium-iron-boron (NdFeB). The preload member 280 includes a bore through its center portion that is slightly larger in diameter than the diameter of the lead screw 250 passing therethrough. A non-ferromagnetic outer preload spacer 284 is abuttingly disposed between the preload member 280 and outer bearing for maintaining the positional relationship of the preload spacer 284 and outer bearing race 276. It is instructive to note that the thickness of the outer preload spacer 284 determines the preload force being applied; as can be determined by those skilled in the art. The preload member 280 is magnetically attracted to the outer bearing race 276, which is matingly and non-rigidly disposed in the frame 202. The preload member 280 also attracts the inner bearing race 274 for providing the axial preload to the radial ball bearing 272 while still allowing axial movement of the lead screw 250.

The bearing assembly 272 operates as follows. The lead screw 250 is induced for rotation by the motor 258 which, in turn, causes the inner bearing race 274 to rotates simultaneously therewith. The preload member 280 causes a magnetic force to attract both the inner bearing race 274 and outer bearing race 276 toward it so that they do not exhibit undesirable axial movement during rotation. The outer bearing race 276 is maintained in a stationary position by the magnetic attraction of the preload member 280. The ball 278 rotates between the inner race 274 and outer race 276, as is obvious to those skilled in the art. The preload member 280 is maintained substantially stationary by the magnetic attraction of both the inner and outer races 274 and 276.

Figure 5:
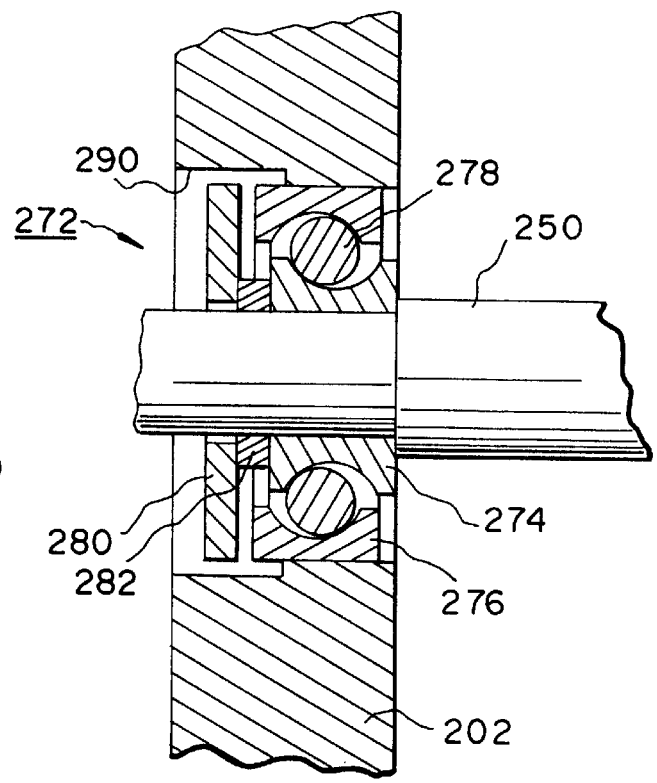
FIG. 5 is an alternative embodiment of FIG. 5.

Referring to FIG. 5, there is illustrated a partial side view in horizontal cross section of an alternative embodiment of the ball bearing assembly of the present invention. The alternative embodiment assembly 272 is the same as that in FIG. 4 except that the spacer 282 is abuttingly disposed between the preload member 280 and the inner bearing race 274. The preload member 280 is again attracted to both the inner bearing race 274 and outer bearing race 276 for providing the axial preload to the radial ball bearing 272 while still allowing axial movement of the lead screw 250. In this embodiment, the motor induces rotation to the lead screw 250 which, in turn, causes the inner bearing race 274 to rotate therewith. The inner bearing race 274 then causes both the preload member 280 and spacer 282 to rotate due to the magnetic attraction between the preload member 280 and inner bearing race 274. The outer bearing race 274 remains stationary.

It will be obvious to those skilled in the art that if the preload member 280 is a permanent magnet, then the inner and outer bearing races, 274 and 276 respectively, can be made from either soft or hard-magnetic materials. If the inner and outer bearing races 274 and 276, respectively, are both permanent magnets, then the preload member 280 can be made from either soft or hard magnetic materials.

The invention has been described with reference to the preferred embodiment thereof. However, it will be appreciated and understood that variations and modifications can be effected within the spirit and scope of the invention as described herein above and as defined in the appended claims by a person of ordinary skill in the art without departing from the scope of the invention.

PARTS LIST

10. Image processing apparatus
12. Image processor housing
14. Image processor door
16. Donor ejection chute
18. Donor waste bin
20. Media stop
32. Thermal print media
34. Dye donor roll material
50. Sheet material trays
50a. Lower sheet material tray
50b. Upper sheet material tray
52. Media lift cams
52a. Lower media lift cam
52b. Upper media lift cam
54. Media rollers
54a. Lower media roller
54b. Upper media roller
56. Media guide
58. Media guide rollers
60. Media staging tray
80. Transport mechanism
100. Media carousel 110. Media drive mechanism
112. Media drive rollers
120. Media knife assembly
122. Media knife blades
180. Color binding assembly
182. Media entrance door
184. Media exit door
200. Lathe bed scanning subsystem
202. Lathe bed scanning frame
204. Entrance passageway
206. Rear translation bearing rod
208. Front translation bearing rod
220. Translation stage member
250. Lead screw
252. Threaded shaft
254. Lead screw drive nut
258. Linear drive motor
260. Axial load magnets
260a. Axial load magnet
260b. Axial load magnet
262. Circular-shaped boss
264. Ball
266. Circular-shaped insert
268. End cap
270. Hollowed-out center portion
272. Radial ball bearing
274. Inner bearing race
276. Outer bearing race
278. Bearing ball
280. Preload member
282. Inner preload spacer
284. Outer preload spacer
300. Vacuum imaging drum
302. Vacuum drum housing
306. Vacuum hole
332. Vacuum grooves
344. Drum encoder
400. Laser assembly
402. Lasers diode
404. Fiber optic cables
406. Distribution block
450. Writing swath
500. Printhead

We claim:

1. An apparatus for maintaining a predetermined positional relationship of a ball bearing track assembly, the apparatus comprising (a) a ball bearing track having first and second ferromagnetic-material track members in a spaced apart relationship at a portion of both said first and second tracks, and further having a ball bearing therein for permitting rotation of either one of said track members with respect to the other track member;

(b) a reciprocally, magnetically attracted permanent magnetic in a spaced apart relationship with respect to said ball bearing track for permitting said magnetically attracted element to reciprocally exchange magnetic attraction between said first track member and said magnetically attracted element; and (c) a spacer disposed between said ball bearing track and said permanent magnet.

2. The apparatus as in claim 1 further comprising a spacer disposed between said first track member and said permanent magnet.

3. The apparatus as in claim 1 further comprising a plurality of ball bearings disposed in said ball bearing track.

4. The apparatus as in claim 3 wherein said permanent magnet is made from rare-earth materials.

5. The apparatus as in claim 3 wherein said permanent magnet is made of neodymium-iron-boron material.

6. An apparatus for maintaining a predetermined positional relationship of a ball bearing track assembly, the apparatus comprising (a) a ball bearing track having first and second track members, which both said track members comprise a permanent magnet, in a spaced apart relationship at a portion of both said first and second tracks, and further having a ball bearing therein for permitting rotation of either one of said track members with respect to the other track member; and (b) a reciprocally, magnetically attracted ferromagnetic-material element in a spaced apart relationship with respect to said ball bearing track for permitting said magnetically attracted element to reciprocally exchange magnetic attraction between said first track member and said magnetically attracted element; and (c) a spacer disposed between said ball bearing track and said permanent magnet.

7. The apparatus as in claim 6 further comprising a spacer disposed between said first track member and said ferromagnetic-material element.

8. The apparatus as in claim 6 further comprising a plurality of ball bearings disposed in said ball bearing track.

9. The apparatus as in claim 8, wherein the permanent magnet is made from rare-earth materials.

10. The apparatus as in claim 8, wherein the permanent magnet is made of neodymium-iron-boron material.

* * * * *